United States Patent [19]
Whitney

[11] Patent Number: 5,871,242
[45] Date of Patent: *Feb. 16, 1999

[54] CARTON, BOX AND BULK MATERIAL LIFTING DEVICE

[76] Inventor: Denzil Whitney, 643 Rio Vista, Napa, Calif. 94558

[*] Notice: This patent issued on a continued prosecution application filed under 37 CFR 1.53(d), and is subject to the twenty year patent term provisions of 35 U.S.C. 154(a)(2).

[21] Appl. No.: 552,703

[22] Filed: Nov. 3, 1995

[51] Int. Cl.$^6$ ..................................................... B65G 7/12
[52] U.S. Cl. ................................ 294/16; 294/28; 294/104
[58] Field of Search ............................ 294/15, 16, 19.1, 294/19.3, 22, 27.1, 28, 29, 31.1, 50.8, 50.9, 61, 104, 106, 118, 902, 903

[56] References Cited

U.S. PATENT DOCUMENTS

| | | |
|---|---|---|
| 1,203,339 | 10/1916 | Holstein . |
| 1,219,726 | 3/1917 | Gray .................................... 294/31.1 X |
| 1,718,398 | 6/1929 | Zaeske .................................... 294/19.1 |
| 1,745,292 | 1/1930 | Buser .................................... 294/50.9 |
| 1,764,919 | 6/1930 | Weeden .................................... 294/104 |
| 2,116,928 | 5/1938 | Hanneman .............................. 294/27.1 |
| 2,442,698 | 2/1948 | Lang . |
| 2,617,143 | 9/1952 | Blake . |
| 2,706,131 | 4/1955 | Matz . |
| 2,759,758 | 8/1956 | Yancey ................................. 294/19.1 X |
| 3,583,745 | 6/1971 | Stuart . |
| 3,909,054 | 9/1975 | Lazzari .................................... 294/50.9 |
| 4,005,893 | 2/1977 | Tash . |
| 4,032,181 | 6/1977 | Money, Sr. . |
| 4,055,364 | 10/1977 | Breite . |
| 4,109,952 | 8/1978 | Monzain . |
| 4,215,889 | 8/1980 | Rayburn . |
| 4,225,174 | 9/1980 | Hennessy et al. . |
| 4,226,349 | 10/1980 | Uccellini . |
| 4,572,566 | 2/1986 | Terrington . |
| 4,577,900 | 3/1986 | Chasen . |
| 4,678,217 | 7/1987 | Viola et al. . |
| 4,707,011 | 11/1987 | McKim . |
| 4,929,010 | 5/1990 | Lahti . |
| 4,930,825 | 6/1990 | Dearman .............................. 294/50.9 |
| 4,965,958 | 10/1990 | Cedergreen et al. ................. 294/16 X |

FOREIGN PATENT DOCUMENTS

| | | | |
|---|---|---|---|
| 811699 | 8/1951 | Germany ................................. 294/16 |
| 81065 | 5/1919 | Switzerland ............................. 294/16 |

*Primary Examiner*—Johnny D. Cherry
*Attorney, Agent, or Firm*—Coudert Brothers

[57] ABSTRACT

The present invention defines a tool for lifting bulk materials, boxes and cartons. The tool has a pair of grips actuating a set of jaws which are pivotally linked together. The jaws contain arrays of projections that squeeze against the corner of an object when actuated. The projections are of a design allowing the carton to be secured without damage. The carton, in the secured state, may be lifted and easily manipulated with only one hand.

10 Claims, 6 Drawing Sheets

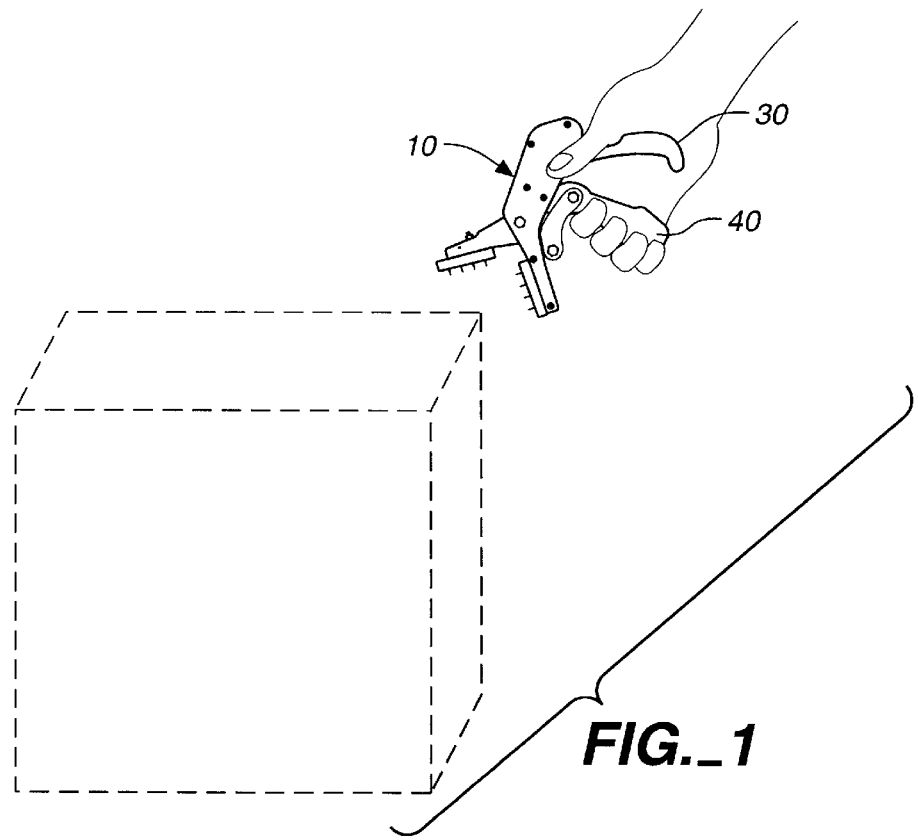
FIG._1
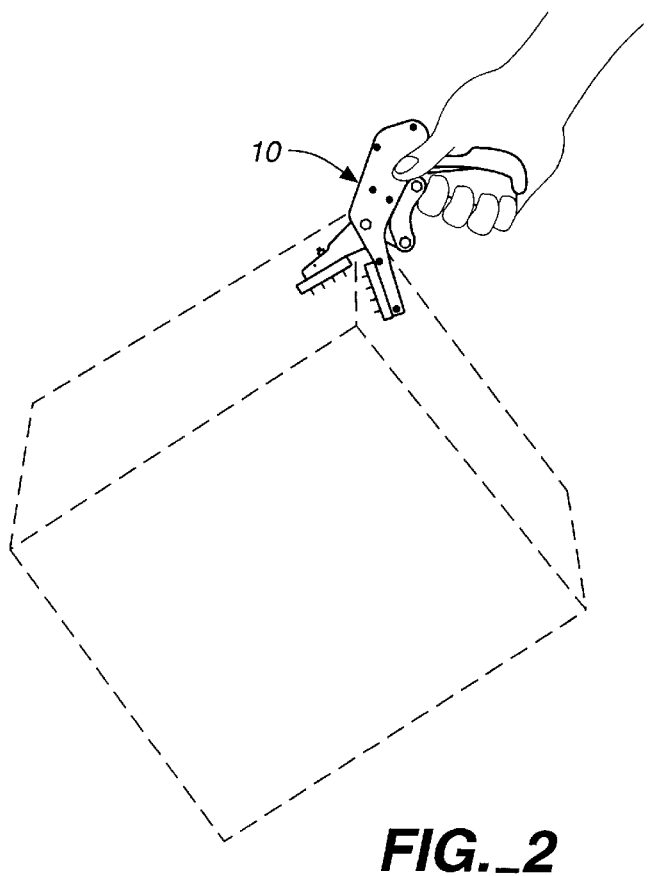
FIG._2

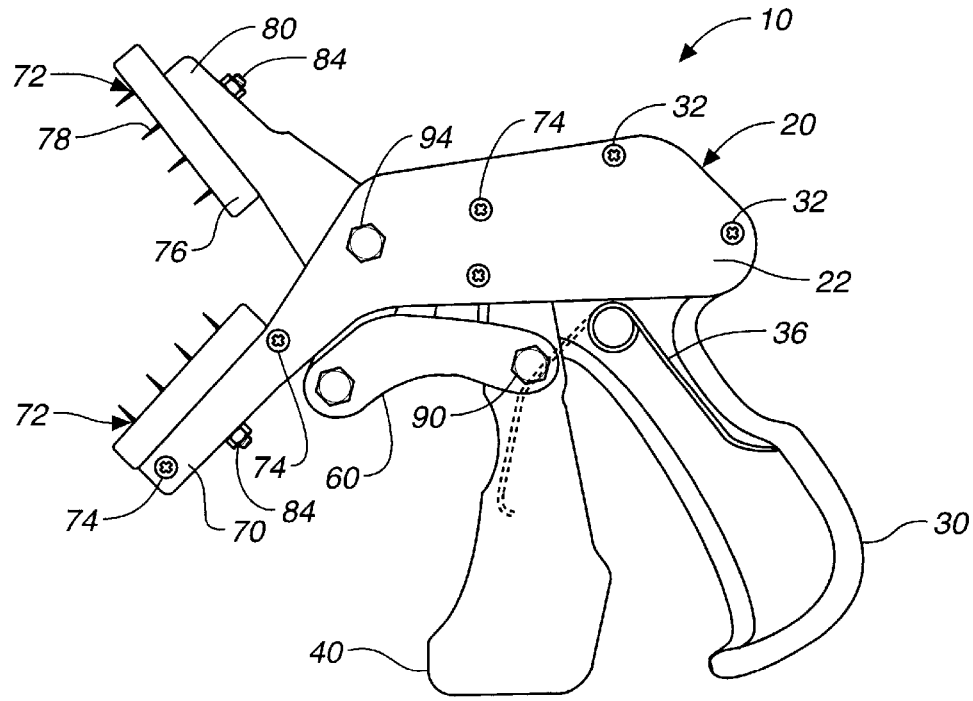
FIG._3
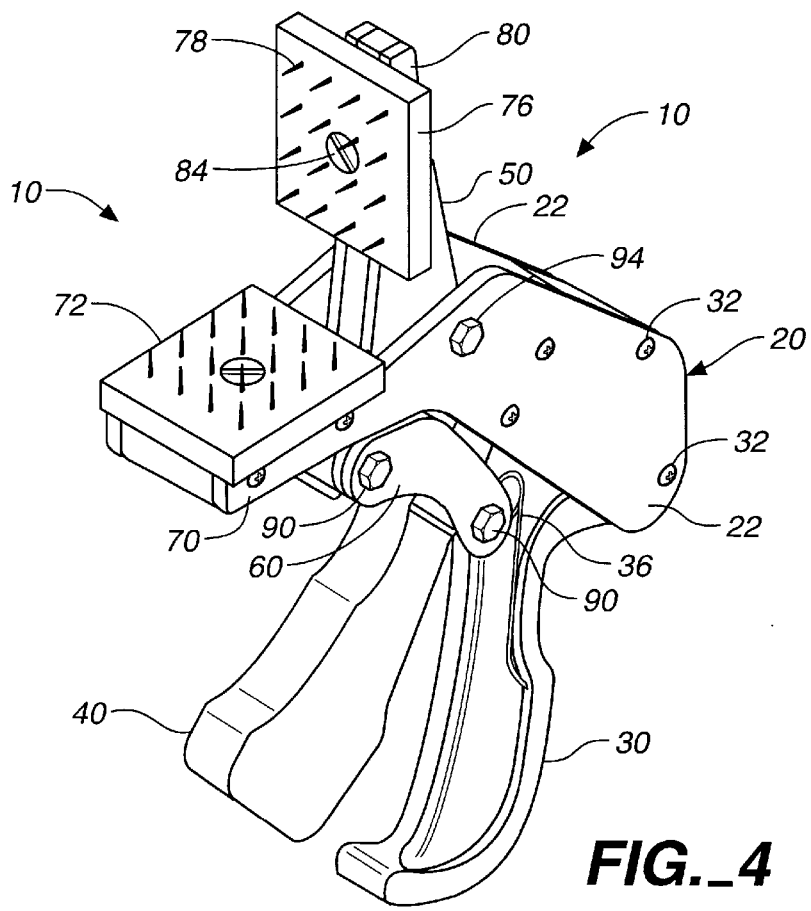
FIG._4

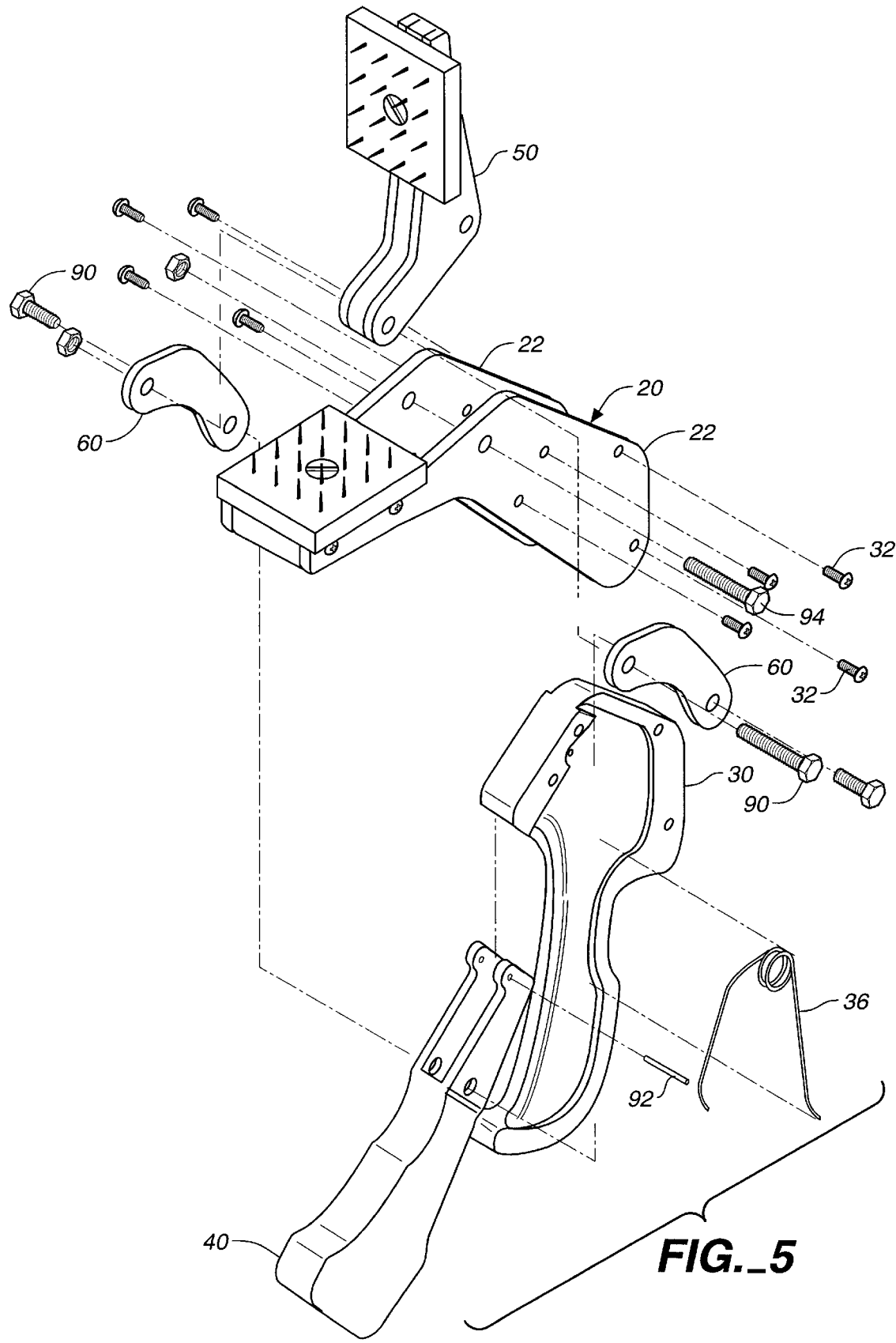
FIG._5

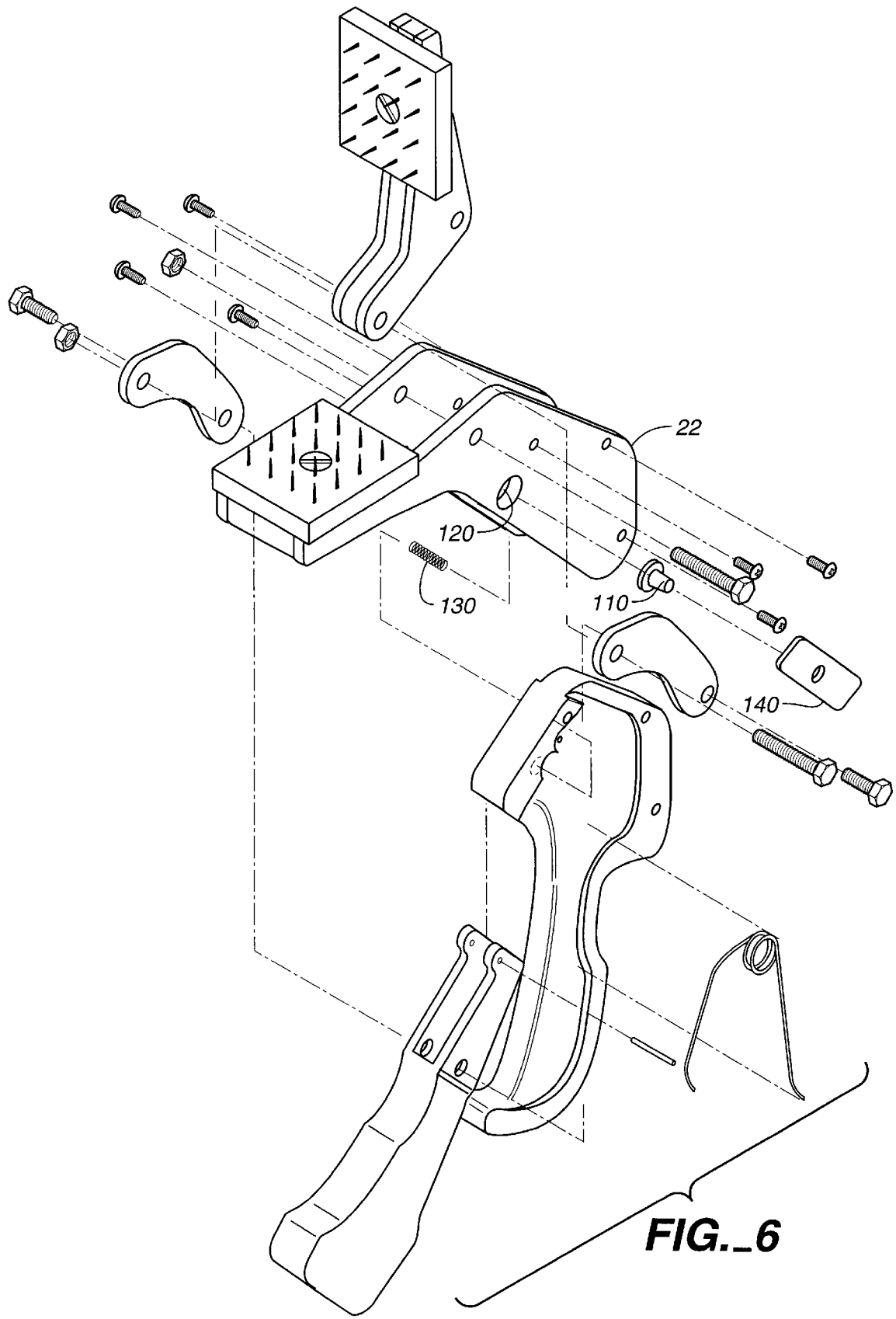
FIG._6

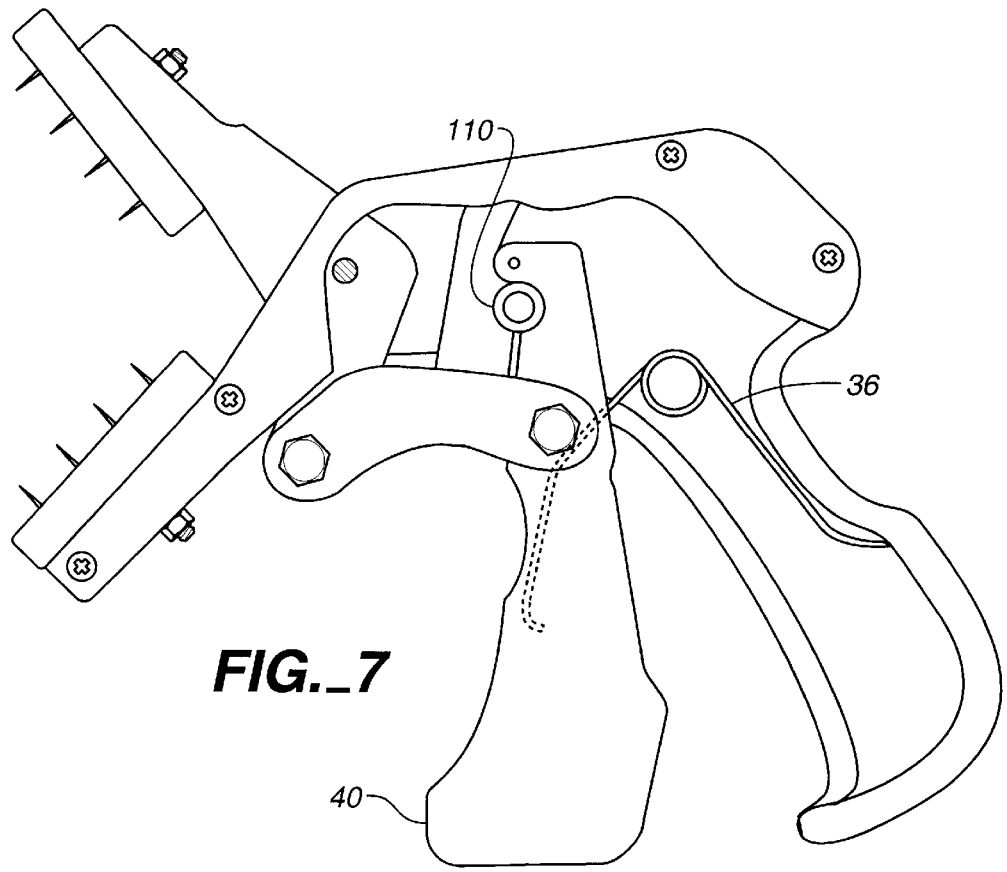
FIG._7
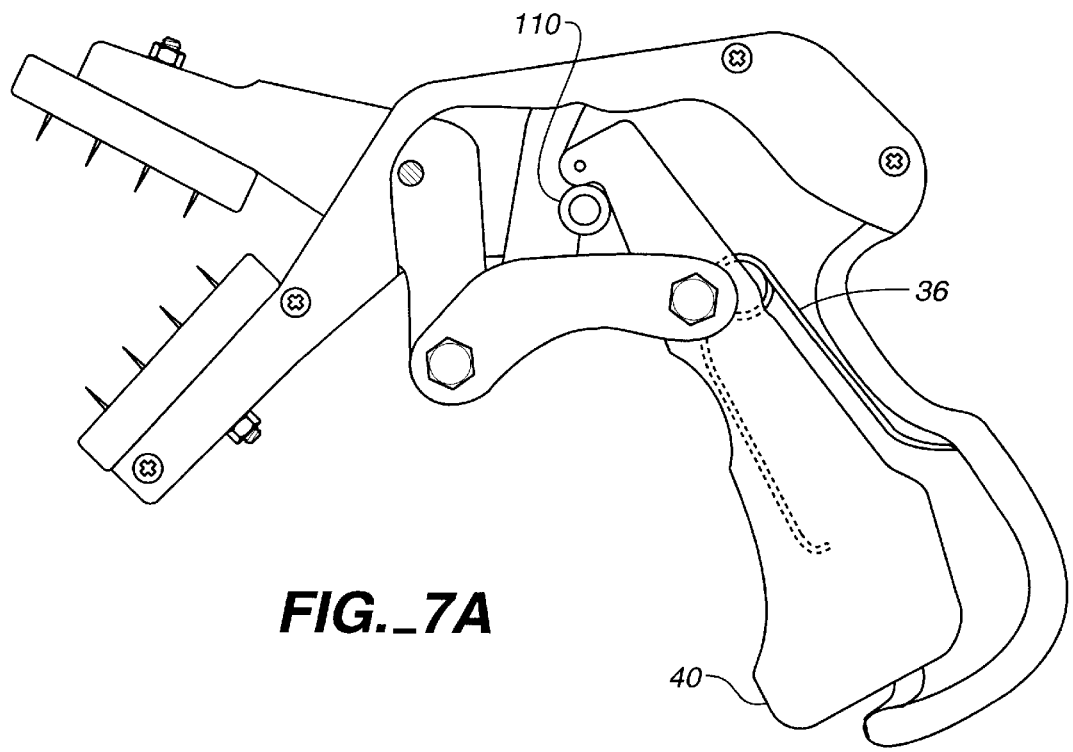
FIG._7A

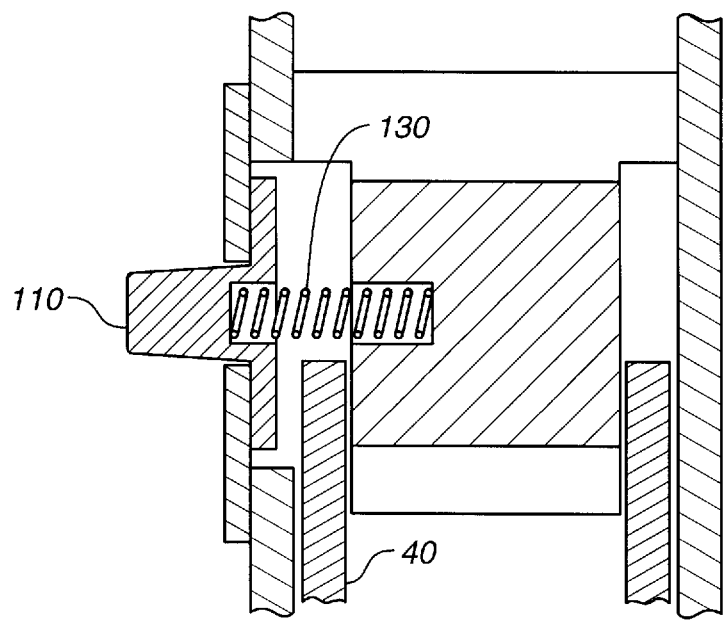
FIG._8
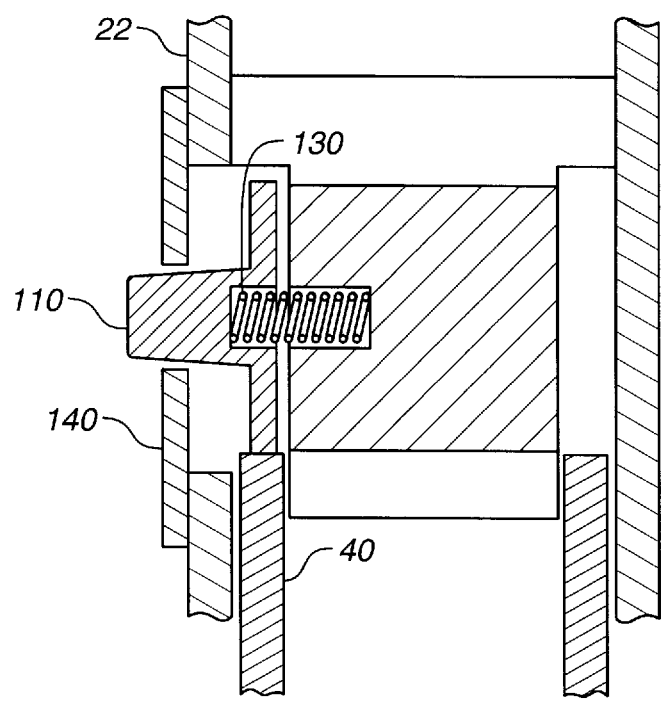
FIG._8A

CARTON, BOX AND BULK MATERIAL LIFTING DEVICE

FIELD OF THE INVENTION

The instant invention defines a tool for lifting cartons, packages, boxes and containers or geometric objects of various shapes. The invention therefore deals with the general technologies of hand tools, and material handling.

BACKGROUND OF THE INVENTION

Anyone who has ever handled parcels, packages, or cartons of a variety of materials, for example cardboard or some other paper or fibrous shipping material, knows how awkward lifting and carrying such cartons can be. In particular, when one attempts to carry a carton and try to do anything else by freeing up a hand, one is at great risk of dropping the carton. In addition, the amount of bending or body English normally required in handling cartons of an awkward size subjects one to the danger of back, neck or shoulder injury.

A prime example of the phenomenon described above is demonstrated by a postal carrier, leaving his or her truck with one or more packages and who must get through a door. To accomplish this basic task, the carrier may do the following or some variation: lean the package against the wall next to the door, either balancing the package on a knee, or seizing it with the weight of his or her body, holding the package against the wall; with the package held temporarily in this fashion, the carrier opens the door with his or her free hand; once the door is open, the carrier quickly re-grabs the package and juts into the open space, getting hit in the back by the closing door. The preceding scenario is only one of a variety of machinations performed by carriers of cartons and packages. Pitfalls of such activities include the dropping of the carton, damaging the packed article or materials, getting hit hard in the back by an automatically closing door, dropping a heavy carton onto oneself, and the like.

What is needed then, is an aid for postal workers, for example, allowing an easier method of carrying boxes or cartons.

Another example which illustrates common problems among materialmen is the movement of boxes or cubes of material from conveyor belts. Standard cubic materials, such as cork, styrofoam, or boxes and cartons require the use of two hands, limiting the ability of workers to perform more than just the single function of moving or transferring the object.

Often, the size or girth of an object or carton is such that while liftable in terms of weight, it takes two persons to manage the piece. This requires both persons to use each of their hands to lift or transport the piece. If a device existed which could allow the manipulation of such pieces such as oversized cartons, then the labor requirement for some handling tasks would be cut in half.

Prior art, for the most part, has concerned itself with scissor-like lifting devices which span a carton in order to pick it up. In U.S. Pat. No. 4,109,952 to Monzain, issued Aug. 29, 1978, a scissor operated tong device was for use in lifting packages. The claws of the device span the carton; thereby requiring a device at least the size of the piece to be lifted. The ends of the claws provide a stable gripping function at the corner of the package. The Monzain device may be operated with only one hand, but the position of the device is such that the carried load typically hangs vertically. Such a vertical positioning of the load is essentially driven by the design of the device, especially when the package to be lifted is of significant weight. No practical provision is made to manipulate the package; only basic lifting and setting of a load is capable with such a device.

Another example of such a scissor-like device is the kind of carrier tool employed to lift car batteries and other heavy objects which are dangerous to touch by hand. Again, the user is limited to simply picking up and putting down whatever load is being carried. Such a device is U.S. Pat. No. 4,678,217, issued to Viola et al. Jul. 7, 1987. In this case, the device simply clamps two parallel sides of a battery or other load. Limited manipulation is possible with a device having such a handle configuration and contacting a box or carton in such a way. In Viola, and other similar devices, the weight of the carton provides the force to close the clamps. Only firm boxes may be lifted when the load is heavy. What is needed is a better way of picking up and manipulating packages, cartons, bulk material and boxes, providing a capability to manipulate and maneuver a load without damage, even when the load is heavy.

Prior art showing a more manipulative way of picking up objects exists as U.S. Pat. No. 4,225,174, issued Sep. 30, 1980 to Hennessy et al. This device uses a trigger actuated set of jaws to collect refuse. Such a device is not designed, however, for picking up large or heavy items. The long distance between the operator's hand and the piece to be picked up or manipulated is too long, allowing too great a moment of force acting on the hand and wrist, making manipulation of heavy or large objects impractical.

Another consideration in the design of such carrying tools is the effect handling cardboard boxes or other objects have on the hands of the worker. Because the outer surface of a carton is relatively slick, and the properties of paper products is such that continued handling removes the moisture and oil out of a worker's hand, continued handling becomes less safe.

What is needed in order to manipulate cartons and boxes then, is a device which will allow the operator to grab an object in such a way to allow the object to be easily manipulated, without the limitation of just vertically lifting and setting the object. The tool must allow some rotation of the object, without the contacting portions of the device getting in the way of placing or shelving said object as desired.

Further, the manipulation of the object must be accomplished with one hand, allowing the handling of larger and heavier loads, and the device should provide a reliable and steady grip on the piece, with care not to damage the object, or in the case of a carton or box, the container or the goods inside. Such a device would provide a significant improvement for warehouse persons, delivery persons and stock workers. No such device as just described is known to presently exist.

SUMMARY OF THE INVENTION

My invention defines a carton lifting device which can be used successfully to handle and manipulate bulk materials, cartons and boxes.

The invention employs a pair of jaws, one pivoted against the other by a pair of grips, one of which is linked to one of the jaws. One of the jaws is attached to the frame assembly which houses the grips. The other jaw is located on an arm which is the pivoted piece. The jaws have on them either fixed or removable arrays of projections. The projections can be of a variety of geometries and materials, but in the claimed embodiment, are pointed, for use with cartons and boxes. Pointed projections may either be straight or at a slight angle of a few degrees thereby providing excellent gripping power and little or no significant damage to the piece being handled. It is an object of the invention to provide a strong, yet undamaging grip on the carton or box it is used on.

The described embodiment discloses the invention as it stands presently. It is anticipated that the frame and stationary grip may also be molded of a strong material, eliminating the need for a separate stationary, or first grip, and also eliminating the need for fasteners for the grip and frame assemblies.

The invention also only requires the use of one hand. The jaws are used typically to grab a corner of a carton. Such positioning allows the handler to apply force in two dimensions, giving greater control and manipulation. The jaws are small in comparison to the prior art, and provide little obstacle to manipulating cartons onto shelves and other work spaces.

Because the instant invention places the hand on the grips close to the corner of the carton being lifted, large and heavy boxes can be manipulated with only one hand. Contributing to the capability of lifting such boxes, the positioning of jaws at the corner of the box provides a stiffer lifting area than the sides or top.

The invention also provides a locking mechanism similar to that used on power drills and the like, allowing the user to clamp down on the carton and effectively keep the desired amount of force without having to maintain a strong grip. In the drawings, a locking button is shown which would be operated by a user when holding the device in the right hand. The locking button may be positioned on the other side of the frame for left hand use as well. Each device, whether a left handed or right handed version, is supplied with a holster to retain and transport the device safely by the user.

The invention provides a novel device for manipulating bulk materials, cartons and boxes. The device not only can be used with one hand, freeing up the other for additional tasks, but will lift large and heavy boxes without significant damage. The device allows extremely flexible manipulation of the pieces to be handled.

BRIEF DESCRIPTION OF THE DRAWINGS

FIG. 1 is a depiction of the device poised above a box with jaws open.

FIG. 2 is a depiction of the device with grips drawn together and jaws closed, with pointed projections engaging a carton.

FIG. 3 is a side elevation view of the device.

FIG. 4 is a frontal perspective of the device highlighting the jaw region.

FIG. 5 is an exploded perspective of said device.

FIG. 6 is an exploded perspective of said device showing an embodiment with a button operated locking mechanism.

FIG. 7 is a side elevation cutaway of the device showing the second grip in the relaxed position.

FIG. 7A is a side elevation cutaway of the device as in FIG. 7, but with the spring compressed by the grips, the jaws drawn together, and the locking button in position.

FIG. 8 is a partial section of a top plan view of the locking button area when the grips are in the relaxed position.

FIG. 8A is a partial section of a top plan view of the locking button area as in FIG. 8 when the grips are drawn together.

DETAILED DESCRIPTION OF THE INVENTION

FIG. 1 depicts a user directing carton lifting device 10, toward a carton, with the grips 30 and 40 in the open state. FIG. 2 shows device 10, in contact with the carton, and the grips squeezed toward one another.

FIGS. 3 and 4 show the basic components of the device. Frame assembly 20 provides the focus for housing first grip 30, and second grip 40. Frame assembly 20, is comprised of two frame plates 22, which are of essentially the same shape, and are fixed together by a series of fastening means, 74. In the shown embodiment, fastening means 74 comprises a screw-type fastener. First grip 30 is fixed within two frame plates 22 as shown in FIG. 4. First grip 30 is fixed within said plates 22 by a plurality of fastening means 32. In the embodiment pictured, fastening means 32 is a screw-type fastener.

Second grip 40 is pivotally fixed between the frame plates by first pin 92 as shown in FIG. 5. This pin may be of a variety of forms, a pin and bushing, a pin retained by snap rings on the outside of plates 22, or any other pivotal means. The grips are biased away from one another by a biasing means 36. A simple spring is depicted in FIGS. 3, 4 and 5, to accomplish this biasing function.

Arm 50 extends through frame assembly 20, and is rotatably fixed in said assembly by second pin 94. Second pin 94 extends through said frame assembly and said arm, allowing it to rotate in a limited fashion. The above comments regarding alternative forms of pivotal attachment for first pin 92 apply to second pin 94 as well. Link 60 connects second grip 40, to a lower portion of arm 50. The shape of the arm is best depicted in FIG. 5. This connection is accomplished by two link pins 90, passing through link 60 and each of second grip 40 and said arm 50. The embodiment depicted in the drawings shows two links, 60. Designs employing only one link are anticipated.

Two arrays 72 of pointed projections are attached by an attachment means 84 to first jaw 70 and second jaw 80. FIGS. 4 and 5 show attachment means 84 as a bolt and nut. Other attachment means may be utilized to achieve the same result. Said arrays 72 comprise a pad 76, and projections 78 located therein.

FIG. 6 shows an embodiment of the device which employs a locking mechanism in the form of button 110, biased outward from the device by spring 130. The button is retained in hole 120 in frame plate 22. Cover plate 140 retains the button in position when not engaged. FIGS. 7 and 7A show the relationship of button 110 and second grip 40. In FIG. 7, second grip 40 is in the relaxed state, inside of button 110. When grips 30 and 40 are drawn together, compressing spring 36, button 110 may be depressed past the pivot area of second grip 40. FIGS. 8 and 8A show these positions of button 110 in detail. In FIG. 8, spring 130 biases the button outward, against cover plate 140.

FIG. 8A shows the change of position of second grip 40, allowing button 110 to be pressed inward to retain said grip 40, thereby locking the device in the carton engaging position. Button 110 is biased outward by spring 130, in position in an aperture 130 defined by frame plate 22 (See FIGS. 6, 8 and 8A). As shown in FIG. 8A, when grip 40 changes position to engage the device with a material or carton, button 110 may be pushed through aperture 130 such that when released a small amount grip 40 pushes against button 110, and the forward structure of grip 30 (See FIGS. 7 and 7A) thereby preventing grip 40 from releasing further. Button 110 is located in substantially concentric alignment with aperture 130 by a second aperture in cover plate 140 (See FIG. 6).

While the invention has been described in connection with what is presently considered the most practical and preferred embodiment(s), it is to be understood that the invention is not limited to the disclosed embodiment(s) but, on the contrary is intended to cover various modifications and equivalent arrangements included within the scope of the appended claims.

What is claimed is:

1. A carton, box and bulk material lifting device comprising:
    a frame having a first grip at one end a first jaw having projections at the other end, said projections emanating from said first jaw at an angle substantially normal thereto, and a cavity therethrough;
    a second grip pivotally fixed in the cavity of said frame;
    biasing means for biasing said first and second grips away from one another;
    an arm having a second jaw with projections at one end, said projections emanating from said second jaw at an angle substantially normal thereto, said arm extending through and rotatably fixed in said cavity; and
    connecting means for linking said arm to said second grip such that when said second grip is pivoted toward said first grip, said arm rotates, closing said jaws and said pointed projections toward one another.

2. A carton, box and bulk material lifting device according to claim 1 further comprising:
    means for pivotally fixing said second grip in said cavity comprising a first pin extending through said frame and said second grip;
    means for rotatably fixing said arm in said cavity comprising a second pin extending through said frame and said arm; and
    said connecting means comprising a plurality of link pins, one of said link pins extending through said link and said arm, another of said link pins extending through said link and said second grip.

3. A carton, box and bulk material lifting device according to claim 1 wherein: said projections are pointed.

4. A carton, box and bulk material lifting device according to claim 1 wherein: said projections emanate from said jaws at a slight angle toward the grip end of said frame.

5. A carton, box and bulk material lifting device according to claim 1 further comprising:
    means for locking and releasing said jaws in position relative to one another, obviating the need to apply constant pressure to said grips when in use.

6. A carton, box and bulk material lifting device comprising:
    a frame having a long arm and a short arm extending at approximately a right angle from one another, said short arm forming a first grip, said long arm forming a first jaw; said frame forming a cavity bounded by said frame on opposing sides, said frame having at least one throughhole coincident with said cavity;
    a second grip having a plurality of holes extending therethrough, one of said holes proximate to one end of said second grip;
    a first pin located in said throughhole of said frame, said first pin also extending through said second grip's end-most hole, pivotally fixing said second grip in said cavity;
    a spring retained in each of said grips, biasing said grips away from one another;
    a second jaw extending through said cavity, said second jaw having a bore coincident with one of said frame's throughholes, said second jaw having a hole proximate to one end;
    a second pin located in said second jaw's bore and extending through said coincident throughhole, rotatably fixing said second jaw in said cavity;
    a link having holes in each end;
    a first link pin extending through one of said link's holes and also through another hole in said second grip;
    a second link pin extending through the other of said link's holes and also through said second jaw's hole such that when said second grip is moved toward said first grip, said link pivots said second jaw in said frame, closing said jaws;
    a first array of pointed projections fixed to said first jaw; and
    a second array of pointed projections fixed to said second jaw, said arrays positioned such that when said jaws are closed, said projections engage said carton, box or bulk material.

7. A carton, box and bulk material lifting device comprising:
    a frame assembly of first and second plates, said plates fixed in parallel alignment to one another at a predetermined distance, said assembly having a grip end and a jaw end;
    a first grip;
    fastening means for affixing said first grip at said grip end of said assembly in a downward projecting direction;
    a second grip pivotally attached between said plates and projecting in a downward direction next to said first grip,
    an arm having a jaw end and a link end, said arm extending through said frame assembly;
    a first array of pointed projections attached to said arm's jaw end forming a movable jaw;
    a second array of pointed projections attached to the jaw end of said frame assembly, forming a stationary jaw;
    a link; and
    means for attaching said link to said arm and said second grip such that when said second grip is pivoted toward said first grip, said jaws close, such that said pointed projections engage said carton, box or bulk material.

8. A carton, box and bulk material lifting device comprising:
    a frame assembly of first and second plates, said plates fixed in parallel alignment to one another at a predetermined distance by screw-type fasteners, said assembly having a grip end and a jaw end;
    a first grip affixed in said frame's grip end by at least one bolt and nut extending through said grip and said plates;
    a second grip pivotally attached between said plates by a pin, and projecting in a downward direction next to said first grip;
    a spring biasing said first grip away from said second grip;
    an arm having a jaw end and a link end, said arm extending through said frame assembly and pivotally attached thereto by a pin;
    a first array of pointed projections attached to said arm's jaw end forming a movable jaw;
    a second array of pointed projections attached to the jaw end of said frame assembly, forming a stationary jaw;
    a link,
    means for attaching said link to said link end of said arm and said second grip comprising a plurality of link pins, one of said link pins extending through said link and said arm, and another of said link pins extending through said link and said second grip, such that when said second grip is pivoted toward said first grip, said arm pivots in said frame assembly, closing said jaws such that said pointed projections engage said carton, box or bulk material; and said first and second grips further comprising a locking and releasing means such that said grips may be locked in a compressed position or released.

9. A carton, box and bulk material lifting device according to claim 8, wherein:

said locking and releasing means further comprising a button;

a first aperture in said one of said plates for housing said button;

a cover plate having a second aperture, said cover plate affixed to said one plate such that said apertures align concentric with one another; and a spring, biasing said button away from said second grip, such that said button may travel through said apertures, preventing said second grip from relaxing, once compressed.

10. A carton, box and bulk material lifting device according to claim 7, wherein:

said arrays of pointed projections being replaceable.

* * * * *

UNITED STATES PATENT AND TRADEMARK OFFICE
CERTIFICATE OF CORRECTION

PATENT NO. : 5,871,242
DATED : February 16,1999
INVENTOR(S) : Denzil Whitney

It is certified that error appears in the above-identified patent and that said Letters Patent is hereby corrected as shown below:

In column 5, line 11, after "end" insert --and--.

Signed and Sealed this

Eighth Day of June, 1999

Attest:

Q. TODD DICKINSON

*Attesting Officer*   *Acting Commissioner of Patents and Trademarks*